Aug. 11, 1925.

R. E. KNEALE

BLADE HOLDING ATTACHMENT FOR SAWS

Filed Dec. 3, 1924

1,548,890

R. E. Kneale
INVENTOR

BY Victor J. Evans
ATTORNEY

WITNESS:
R. E. Wise.

Patented Aug. 11, 1925.

1,548,890

UNITED STATES PATENT OFFICE.

ROBERT E. KNEALE, OF VICTORIA, BRITISH COLUMBIA, CANADA.

BLADE-HOLDING ATTACHMENT FOR SAWS.

Application filed December 3, 1924. Serial No. 753,747.

*To all whom it may concern:*

Be it known that I, ROBERT E. KNEALE, a subject of the King of Great Britain, residing at Victoria, in the Province of British Columbia and Dominion of Canada, have invented new and useful Improvements in Blade-Holding Attachments for Saws, of which the following is a specification.

This invention relates to hack saws, and more particularly to the means utilized for associating the blade with the frame of the saw.

The chief characteristic of the present invention resides in the provision of means for connecting the blade with the frame of the saw, and designed to be again used with a broken blade by simply providing the broken blade with a notch in one edge thereof, the invention residing in the construction, combination and arrangement of parts as claimed.

In the drawing forming part of this application, like numerals of reference indicate similar parts in the several views, and wherein.

Figure 3:
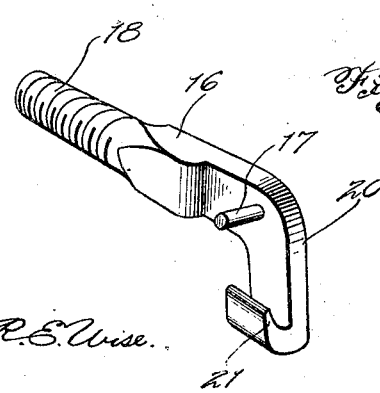
Figure 3 is a perspective view of the device forming the subject matter of the invention.

Referring to the drawings in detail, 10 indicates generally a saw frame of well known construction with which a separable blade 11 is used. The frame is provided with the usual handle 12, while the blade 11 is arranged between and connected with the spaced parallel portions 13 of the frame. These portions terminate to provide bearings 14 which receive the elements constituting the means for fastening the blade 11 to the frame, the present invention residing in the construction of these elements, which permits the latter to be used in connection with a new blade and subsequently used in connection with a broken blade. These blades are usually provided with perforations 15 which receive different sorts of fastening elements by means of which the blade is adjustably connected with the frame, and in accordance with the present invention, each fastening element 16 is provided with one of these pins indicated at 17. As shown in Figure 3, the shank of the fastening element is threaded as at 18 to accommodate the winged nut 19 after the element has been passed through the bearing 14 of the frame, but it might here be stated that the shank may be of any suitable construction and held associated with the frame in any other way as this does not form any part of the invention.

The invention consists in providing the shank 18 with a deflected extremity 20, the latter being arranged substantially at a right angle to the shank 18 and having its free end upturned to form a hook like portion 21. The pin 17 projects laterally from the extremity 20 and from the same side on which the hook 21 is formed.

Figure 1:
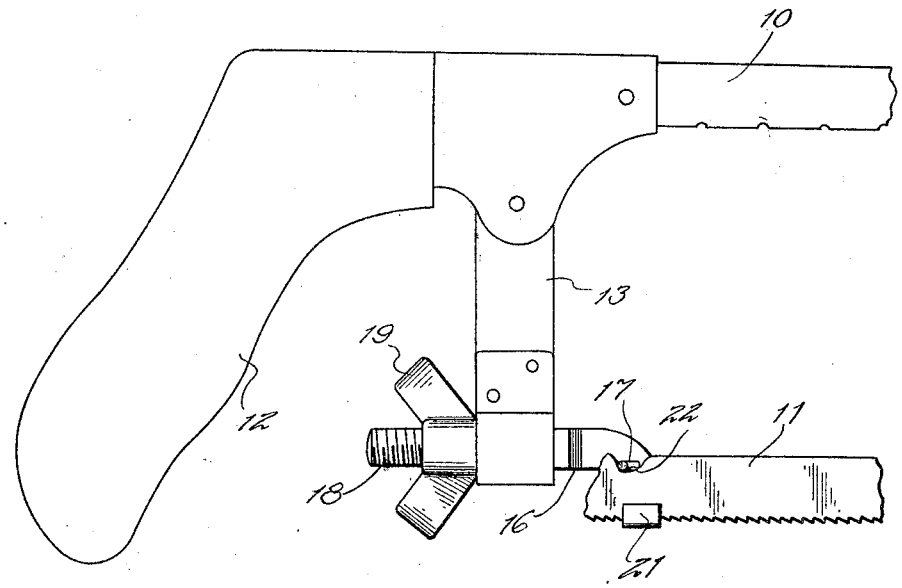
Figure 1 is a fragmentary view of a saw showing how the invention is used in conjunction with the broken saw blade.
Figure 2:
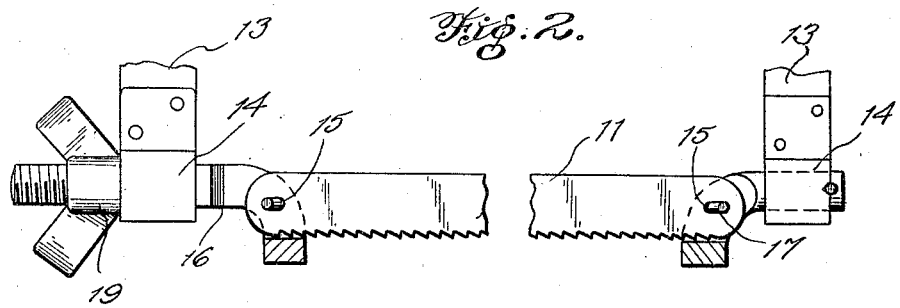
Figure 2 is a fragmentary view showing how the invention is initially used in connection with an unbroken blade.

In practice, the pin 17 is received by the perforation 15 at the adjacent end of the blade 11, and the blade is thus supported on the frame as clearly shown in Figure 2. When the pin is arranged in the perforations 15, the toothed edge of the saw is arranged above the hook like extremity 21, the latter having no utility whatever in connection with a new or unbroken blade. However, should the blade be broken in a manner to eliminate the use of the perforation 15, the fastening element can be further used to support a broken blade on the frame in the manner shown in Figure 1. For this purpose it is only necessary to provide one edge of the blade with a notch 22 to receive the pin 17, in which instance, the lower toothed edge of the blade is received by the hook like portion 21, the blade being supported between the hook like portion 21 and the pin 17. The invention is very simple in construction and can be manufactured and sold at a nominal cost.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. The combination with a saw frame and a removable blade, of a fastening element for connecting the blade with said frame, said element including a shank adapted to be supported by the frame, one end of the shank projecting transversely of the shank, and terminating in a hook like portion, a pin adapted to be passed through a perforation in the blade, or adapted to be received by a notch formed in one edge of the blade, and said hook like portion receiving and supporting the other edge of the blade when the pin is arranged in said notch.

2. A new and improved article of manufacture comprising a fastening element for connecting a saw blade with the frame of a saw, said element including a shank having one end projecting transversely of the shank and terminating in a hook like portion, and a pin projecting laterally from the offset end and arranged directly above the hook like portion for the purpose specified.

In testimony whereof I affix my signature.

ROBERT E. KNEALE.